United States Patent

Hamada et al.

[11] Patent Number: 5,565,524
[45] Date of Patent: Oct. 15, 1996

[54] GOLF BALL

[75] Inventors: Akihiko Hamada, Kakogawa; Yoshikazu Yabuki; Yoshinori Sano, both of Akashi, all of Japan

[73] Assignee: Sumitomo Rubber Industries, Ltd., Hyogo-ken, Japan

[21] Appl. No.: 337,024

[22] Filed: Nov. 7, 1994

[30] Foreign Application Priority Data

Nov. 9, 1993 [JP] Japan ................... 5-304828

[51] Int. Cl.$^6$ .......................... A63B 37/12; C08L 33/02; C08L 23/08
[52] U.S. Cl. ................... 525/208; 525/196; 473/378
[58] Field of Search ................... 525/196, 208; 273/235

[56] References Cited

U.S. PATENT DOCUMENTS

| | | | |
|---|---|---|---|
| 3,789,035 | 1/1974 | Iwami et al. | 260/78.5 T |
| 4,346,196 | 8/1982 | Hoh et al. | 525/196 |
| 4,956,414 | 9/1990 | Muehlenbernd et al. | 525/196 |
| 5,187,013 | 2/1993 | Sullivan | 525/196 |
| 5,397,840 | 3/1995 | Sullivan et al. | 525/196 |

FOREIGN PATENT DOCUMENTS

| | | |
|---|---|---|
| 0557069 | 8/1993 | European Pat. Off. . |
| 2247682 | 11/1992 | United Kingdom . |

*Primary Examiner*—Carman J. Seccuro, Jr.
*Attorney, Agent, or Firm*—Birch, Stewart, Kolasch & Birch, LLP

[57] ABSTRACT

The present invention provides a golf ball which is superior in hit feeling, control properties, flying performances and cut resistance. As the base resin of the cover of the golf ball, a heated mixture composed of (A) an ionomer resin or a mixture thereof, (B) a terpolymer resin of α-olefin, unsaturated carboxylate and unsaturated carboxylic acid and (C) a glycidyl group-containing α-olefinic copolymer resin is used.

8 Claims, No Drawings

GOLF BALL

FIELD OF THE INVENTION

The present invention relates to a golf ball. More particularly, it relates to a golf ball which is superior in hit feeling, control properties, flying performances and cut resistance.

BACKGROUND OF THE INVENTION

Recently, an ionomer resin has widely been used as a base resin for a cover of a golf ball (e.g. Japanese Laid-Open Patent Publication No. 49-27093). Particularly, the ionomer resin is exclusively used in a two-piece golf ball using a solid core.

This is because the ionomer resin is superior in durability, cut resistance and resilience performances, and, further, it is easily processed and inexpensive in comparison with other base resin for the cover.

However, the ionomer resin is inferior in hit feeling and control properties (easiness of applying spin on a ball) in comparison with a balata (transpolyisoprene) used as the base resin for the cover of the thread wound golf ball since the ionomer resin has considerably high hardness and stiffness.

Therefore, an attempt to improve the hit feeling and control performances by softening the ionomer resin with various means has been made.

For example, Japanese Laid-Open Patent Publication Nos. 1-308577 and 5-3913 suggest that a high-rigid ionomer resin is softened by blending (mixing) a soft ionomer resin, obtained by neutralizing a terpolymer of α-olefin, unsaturated carboxylic acid (e.g. acrylic acid, methacrylic acid, etc.) and acrylate with sodium or zinc ion, to improve the hit feeling and control properties.

However, even if the soft ionomer resin as described above is blended, the hit feeling similar to that of the golf ball with the balata cover have still to be obtained. Further, blending of the soft ionomer resin is accompanied by deterioration of resilience performances and flying performances and, therefore, satisfactory results have not been obtained.

As described above, the ionomer resin cover is inferior in hit feeling and control properties in comparison with the thread wound golf ball with the balata cover mainly used for thread wound golf balls, because the ionomer resin has high hardness and stiffness. Further, satisfactory results have not been obtained in an attempt to improve the hit feeling and control properties by softening the ionomer resin.

SUMMARY OF THE INVENTION

Under these circumstances, in order to satisfy excellent hit feeling and control properties which are similar to those of the golf ball with the balata cover, as well as excellent flying performances and cut resistance due to the ionomer resin, the present inventors have intensively studied about the base resin for the cover. As a result, it has been found that, when a resin mixture obtained by adding (a) a terpolymer resin of α-olefin, unsaturated carboxylate and unsaturated carboxylic acid as a soft resin component and (b) a glycidyl group-containing α-olefinic copolymer resin, which has a reactivity with both a high-rigid ionomer resin and the terpolymer resin, to (c) the ionomer resin, followed by mixing with heat is used as the base resin of the cover, a golf ball which is superior in hit feeling, control properties, resilience performances, flying performances and cut resistance can be obtained. Thus, the present invention has been completed.

The main object of the present invention is to provide a golf ball which is superior in hit feeling, control properties, flying performances and cut resistance.

This object as well as other objects and advantages of the present invention will become apparent to those skilled in the art from the following description.

The present invention provides a golf ball having a core and a cover for covering the core, a base resin of said cover comprising a heated mixture of the following resin (A), resin (B) and resin (C):

resin (A): an ionomer resin or a mixture thereof;

resin (B): a terpolymer resin of α-olefin, unsaturated carboxylate and unsaturated carboxylic acid; and resin (C): a glycidyl group-containing α-olefinic copolymer resin.

DETAILED DESCRIPTION OF THE INVENTION

The resin (A) is a so-called high-rigid ionomer resin or a mixture thereof, which is a factor for producing excellent flying performances and cut resistance.

The resin (B) is a so-called soft resin component, which softens the high-rigid resin (A). Further, the resin (C) has a reactivity with both resins (A) and (B), which improves a compatibility between the resins (A) and (B) and improves physical properties.

In the present invention, the high-rigid ionomer resin (A) is softened by mixing the terpolymer resin of α-olefin, unsaturated carboxylate and unsaturated carboxylic acid of the resin (B) as the soft resin component, thereby improving the hit feeling and control properties.

In the present invention, the glycidyl group-containing α-olefinic copolymer resin of the resin (C) is further added to the above two kinds of resins, which are mixed with heating. Therefore, a carboxyl group in the ionomer resin of the resin (A) and the terpolymer resin of the resin (B) are reacted with a glycidyl group of the resin (C), respectively, to accomplish uniform fine dispersion of resin (B) into resin (A) and improvement of physical properties due to co-crosslinking, thereby maintaining satisfactory flying performances and cut resistance.

In the present invention, typical examples of the ionomer resin of the resin (A) include an ionomer resin wherein a part of a carboxyl group in a copolymer of 80 to 90% by weight of α-olefin and 10 to 20% by weight of α,β-unsaturated carboxylic acid having 3 to 8 carbon atoms is neutralized with a metal ion (e.g. sodium ion, lithium ion, zinc ion, magnesium ion, etc.).

Examples of the α-olefin include ethylene, propylene, 1-butene, 1-pentene and the like. Among them, ethylene is particularly preferred. Examples of the α,β-unsaturated carboxylic acid having 3 to 8 carbon atoms include acrylic acid, methacrylic acid, fumaric acid, maleic acid, crotonic acid and the like. Among them, acrylic acid and methacrylic acid are preferred.

Various types of ionomer resins are commercially available from Du Pont U.S.A. Co., Ltd. under the trade name of Surlyn® and from Mitsui Du Pont polychemical Co. under the trade name of Hi-milane. In the present invention, these ionomer resins may be used alone or in combination thereof.

The resin (B) is a terpolymer resin of α-olefin, unsaturated carboxylate and unsaturated carboxylic acid, which can be a soft resin component. Examples of the α-olefin include ethylene, propylene, 1-butene, 1-pentene and the like. It is particularly preferred to use ethylene.

Examples of the unsaturated carboxylate as the second component of the resin (B) include methyl (meth)acrylate, ethyl (meth)acrylate, 2-methoxyethyl (meth)acrylate, n-butyl (meth)acrylate, isobutyl (meth)acrylate, 2-ethylhexyl (meth)acrylate, etc. Among them, an ester of acrylic acid is preferred. In this antext, (meth)acrylate means either acrylate or methacrylate.

Examples of the unsaturated carboxylic acid as the third component of the resin (B) include monobasic acids such as acrylic acid, methacrylic acid, etc.; dibasic acids such as fumaric acid, maleic acid, itaconic acid, etc.; half esters of dibasic acids, etc.

The terpolymer resin of the resin (B) is formulated for the purpose of softening the ionomer resin of the resin (A) and, therefore, it is preferred that the stiffness is low in comparison with that of the ionomer resin of the resin (A) (normally, 2,500 to 3,500 kgf/cm$^2$). The stiffness is preferably within a range from 10 to 1,000 kg/cm$^2$, more preferably from 10 to 500 kg/cm$^2$.

Regarding the composition ratio of the respective components of the terpolymer resin of the resin (B), it is preferred that the amount of α-olefin, unsaturated carboxylate and unsaturated carboxylic acid is 50 to 79% by weight, 10 to 40% by weight and 1 to 10% by weight, respectively, taking physical properties such as stiffness and reactivity with the glycidyl group-containing α-olefinic copolymer resin of the resin (C) into consideration.

As the α-olefin component of the glycidyl group-containing α-olefin copolymer resin of the resin (C), there can be used the same olefins as those used in the terpolymer resin of α-olefin, α,β-unsaturated carboxylate and unsaturated carboxylic acid of the above resin (B). It is particularly preferred to use ethylene.

As the glycidyl group component of the resin (C), for example,

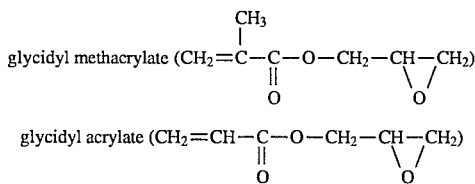

are preferred in view of a copolymerizability with α-olefin.

In order to adjust hardness, melt index, etc, further, copolymerization components such as acrylate, methacrylate, vinyl acetate, etc. may be added to the glycidyl group-containing α-olefinic copolymer resin, in addition to the above glycidyl group component and α-olefin component.

Examples of the glycidyl group-containing α-olefinic copolymer resin of the resin (C) include various types of resins such as ethylene-glycidyl methacrylate copolymer resin, ethylene-glycidyl methacrylate-methyl acrylate terpolymer resin, ethylene-glycidyl methacrylate-vinyl acetate terpolymer resin, etc., which are commercially available from Sumitomo Chemical Co., Ltd. under the trade name of "BONDFAST". These are used alone or in combination thereof.

In the present invention, regarding the composition ratio of the respective components in the heated mixture of the resins (A), (B) and (C) constituting the base resin of the cover, it is preferred that the amount of the resins (A), (B) and (C) is 30 to 85% by weight, 10 to 69.8% by weight and 0.2 to 5% by weight, respectively.

When the amount of the resin (A) is smaller than 30% by weight, excellent flying performances and cut resistance due to the ionomer resin are deteriorated. On the other hand, when the amount of the resin (A) is larger than 85% by weight, softening can not be sufficiently accomplished and properties of the ionomer resin appear strongly, which results in deterioration of hit feeling and control properties.

When the amount of the terpolymer resin of α-olefin, unsaturated carboxylate and unsaturated carboxylic acid of the resin (B) is smaller than 10% by weight, softening can not be sufficiently accomplished. On the other hand, when the amount is larger than 69.8%, the flying performances and cut resistance are deteriorated and, therefore, a satisfactory golf ball can not be obtained.

When the amount of the glycidyl group-containing α-olefinic copolymer resin of the resin (C) is smaller than 0.2% by weight, the compatibility between the resins (A) and (B) is deteriorated and the improvement of resilience performances are not sufficiently conducted. On the other hand, when the amount of the component (C) is larger than 5% by weight, the fluidity of the resin is deteriorated by the excessive reaction and, therefore, satisfactory molding of the cover can not be conducted.

In the present invention, desired characteristics are obtained by mixing the above three kinds of resins with heating. The mixing with heating can be normally conducted by mixing under the heating condition at a temperature of 150° to 250° C. for 0.5 to 15 minutes using an internal mixer such as kneading type twin-screw extruder, Banbury mixer, kneader and the like.

If necessary, various additives such as pigments, dispersants, antioxidants, UV absorbers, photostabilizers, etc. can be formulated in the cover used in the present invention, in addition to the base resin of the heated mixture of the above three kinds of resins. Further, the other resin may be added unless characteristics of the above base resin are not deteriorated.

Further, a golf ball can be obtained by covering the cover on the core. As the core, any of a core for solid golf ball and a core for thread wound golf ball can be used.

The solid core may be a core for a multi-layer golf ball of two or more layers. For example, as the core for a two-piece golf ball, those obtained by subjecting a rubber composition to a press vulcanization to compress with heating (e.g. at a temperature of 140° to 170° C. for 10 to 40 minutes) into a spherical vulcanized article can be used. The rubber composition is preferably prepared from 10 to 60 parts by weight of at least one vulcanizing agent (crosslinking agent) of α,β-monoethylenically unsaturated carboxylic acids (e.g. acrylic acid, methacrylic acid, etc.) or metal salts thereof and functional monomers (e.g. trimethylolpropane trimethacrylate, etc.), 10 to 30 parts by weight of a filler (e.g. zinc oxide, barium sulfate, etc.), 0.5 to 5 parts by weight of a peroxide (e.g. dicumyl peroxide, etc.) and 0.1 to 1 part by weight of an antioxidant, based on 100 parts by weight of polybutadiene.

The thread wound core is composed of a center and a thread rubber wound on the center. As the center, any of a liquid center and a rubber center can be used. As the rubber center, there can be used those obtained by vulcanizing the same rubber composition as that of the solid core.

The thread rubber may be those which have hitherto been used. For example, there can be used those obtained by vulcanizing a rubber composition wherein an antioxidant, a vulcanizing accelerator and sulfur are formulated in a natural rubber or a natural rubber and synthetic polyisoprene.

The core is not limited to the solid core and thread wound core.

A method of covering the cover on the core is not specifically limited, but may be a normal method. For example, there can be employed a method comprising molding a composition for the cover prepared by formulating a suitable amount of a requisite additive in the base resin composed of the heated mixture of the above three kinds of reins into a semi-spherical half-shell in advance, covering a core with two half-shells and then subjecting to a pressure molding at 130° to 170° C. for 1 to 5 minutes, or a method comprising subjecting the composition for the cover to an injection molding directly to cover the core.

The thickness of the cover is normally about 1.0 to 3.0 mm. In case of cover molding, a dimple may be formed on the surface of the ball, if necessary. Further, if necessary, a paint or marking may be provided after cover molding.

As described above, according to the present invention, there can be obtained a golf ball which is superior in hit feeling, control properties, flying performance and cut resistance.

EXAMPLES

The following Examples and Comparative Examples further illustrate the present invention in detail but are not to be construed to limit the scope thereof.

Examples 1 to 7 and Comparative Examples 1 to 7

(Thread wound golf ball).

(1) Preparation of core

A thread wound core having an outer diameter of 39.5 mm was prepared by winding a thread rubber comprising a natural rubber/low-cis IR [Shell IR-309 (trade name)](= 50:50 (weight ratio)) as the base rubber on a liquid center having an outer diameter of 28.1 mm, said liquid center comprising a paste obtained by dispersing barium sulfate in water and a center bag of a vulcanized natural rubber having a thickness of 1.7 mm, which covers the paste.

(2) Preparation of composition for cover

Formulation components shown in Tables 1 and 2 were mixed by a kneading type twin-screw extruder to prepare a pelletized composition for the cover. The formulations of Preparation Examples 1 to 7 are shown in Table 1 and those of Comparative Preparation Examples 1 to 7 are shown in Table 2. The formulation materials of which trade names were shown in Table 1 and Table 2 will be explained at the back of Table 2. In the explanation about the formulation materials, "MI" is an abbreviation for "Melt Index". The amount of each component in Tables 1 and 2 is "parts by weight".

The extrusion conditions are as follows: a screw diameter: 45 mm; a screw revolution per minute: 200 rpm; a screw L/D: 35. The formulation components were heated at 220° to 260° C. at the die position of the extruder.

TABLE 1

| | Preparation Example No. | | | | | | |
|---|---|---|---|---|---|---|---|
| | 1 | 2 | 3 | 4 | 5 | 6 | 7 |
| Resin (A): | | | | | | | |
| Hi-milane #1706*[1] | 56 | 48 | 48 | 56 | 48 | 48 | 48 |
| Hi-milane #1555*[2] | 14 | 12 | 12 | 14 | 12 | 12 | 12 |
| Resin (B): | | | | | | | |

TABLE 1-continued

| | Preparation Example No. | | | | | | |
|---|---|---|---|---|---|---|---|
| | 1 | 2 | 3 | 4 | 5 | 6 | 7 |
| Trial soft resin manufactured by Nucrel*[3] | 29 | 39 | 38 | — | — | — | — |
| Nucrel AN-4212C*[4] | — | — | — | 29 | 39 | 39.5 | — |
| Trial resin (1)*[5] | — | — | — | — | — | — | 39 |
| Resin (C): | | | | | | | |
| BONDFAST 7L*[6] | 1.0 | 1.0 | 2.0 | 1.0 | 1.0 | 0.5 | 1.0 |
| Titanium dioxide | 2.0 | 2.0 | 2.0 | 2.0 | 2.0 | 2.0 | 2.0 |

TABLE 2

| | Comparative Preparation Example No. | | | | | | |
|---|---|---|---|---|---|---|---|
| | 1 | 2 | 3 | 4 | 5 | 6 | 7 |
| Resin (A): | | | | | | | |
| Hi-milane #1605*[7] | 50 | — | — | — | — | — | — |
| Hi-milane #1706 | 50 | 48 | 56 | 48 | 56 | 48 | 48 |
| Hi-milane #1555 | — | 12 | 14 | 12 | 14 | 12 | 12 |
| Surlyn AD #8269*[8] | — | 40 | — | — | — | — | — |
| Resin (B): | | | | | | | |
| Trial soft resin manufactured by Nucrel | — | — | 30 | 40 | — | — | — |
| Nucrel AN-4212C | — | — | — | — | 30 | 40 | — |
| Trial resin (1) | — | — | — | — | — | — | 40 |
| Titanium dioxide | 2.0 | 2.0 | 2.0 | 2.0 | 2.0 | 2.0 | 2.0 |

*[1]Trade name, ethylene-methacrylic acid ionomer resin obtained by neutralizing with zinc ion manufactured by Mitsui Du Pont Polychemical Co., MI: 0.8, stiffness: 2,600 kgf/cm$^2$
*[2]Trade name, ethylene-methacrylic acid ionomer resin obtained by neutralizing with sodium ion manufactured by Mitsui Du Pont Polychemical Co., MI: 10, stiffness: 2,050 kgf/cm$^2$
*[3]Trade name, ethylene-isobutyl acrylate-methacrylic acid terpolymer resin (composition weight ratio: 74/24/2) manufactured by Mitsui Du Pont Polychemical Co., MI: 5.0, stiffness: 175 kgf/cm$^2$
*[4]Trade name, ethylene-isobutyl acrylate-methacrylic acid terpolymer resin (composition weight ratio: 76/20/4) manufactured by Mitsui Du Pont Polychemical Co., MI: 12, stiffness: 245 kgf/cm$^2$
*[5]Trial resin (1) Composition ratio: ethylene/ethyl acrylate/monoethyl maleate = 70/27/3 (weight ratio), synthesized by copolymerizing ethylene with ethyl acrylate and monoethyl maleate in the presence of a free-radical initiator (peroxide catalyst) at 150° C. at 1,650 kg/cm$^2$ using a 1 liter continuous type autoclave equipped with a stirrer, stiffness: 50 to 100 kgf/cm$^2$
*[6]Trade name, ethylene-glycidyl methacrylate-methyl acrylate terpolymer resin manufactured by Sumitomo Chemical Co., Ltd., Composition ratio: ethylene/glycidyl methacrylate/methyl acrylate = 67/3/30 (weight ratio), MI: 9, stiffness: 60 kgf/cm$^2$
*[7]Trade name, ethylene-methacrylic acid ionomer resin obtained by neutralizing with sodium ion manufactured by Mitsui Du Pont Polychemical Co., ml: 2.8, stiffness: about 3,100 kgf/cm$^2$
*[8]Trade name, ethylene-methacrylic acid-butyl acrylate terpolymer soft ionomer resin obtained by neutralizing with a sodium ion manufactured by Du Pont U.S.A. Co., MI: 1.2, stiffness: about 300 kgf/cm$^2$ (3) Production of golf ball A thread wound golf ball was obtained by molding a semi-spherical half-shell from the cover composition of the above item (2), covering the core of the item (1) with two half-shells and then subjecting to press molding in a die for the golf ball. The thread wound golf ball was coated with a paint to give a coated golf ball of 42.7 mm in diameter.

The ball weight, the ball compression, the ball initial velocity and the flying distance of the golf ball thus obtained were measured. The ball compression was measured by PGA method, and the ball initial velocity was measured by R & A initial velocity measuring method. The flying distance was measured by hitting with a No.1 wood club at a head speed of 45 m/second, using a swing robot manufactured by True Temper Co.

Further, the hit feeling and the control properties of the resulting golf ball were evaluated by 10 top professional golfers according to a practical hitting test. The evaluation criteria are as follows. The results shown in the Tables below are based on the fact that not less than 8 out of 10 professional golfers evaluated with the same criterion about each test item.

Evaluation criteria

○: Good, hit feeling and control properties are similar to those of the golf ball with the balata cover.

Δ: Control properties are similar to those of the golf ball with the balata cover, but hit feeling is quite different from that of the golf ball with the balata cover, that is, it is too hard, which results in too strong impact, or it is too soft, which results in heavy feeling.

x: Both hit feeling and control properties are inferior.

In Table 3, the physical properties, the hit feeling and the control properties of the golf balls of Examples 1 to 7, and the kind of the composition for the cover used in the production of the golf ball are shown. In Table 4, the physical properties, the hit feeling and the control properties of the golf balls of Comparative Examples 1 to 7, and the kind of the composition for the cover used in the production of the golf ball are shown. The kind of the composition for the cover is shown by Preparation Example No. or Comparative Preparation Example No.

Among the above golf balls, the golf ball of Comparative Example 1 is a standard thread wound golf ball with the ionomer cover wherein only a high-rigid ionomer resin is used as the base resin of the cover, and the golf ball of Comparative Example 2 is a thread wound golf ball coated with a soft cover wherein a soft ionomer resin disclosed in Japanese Laid-Open Patent Publication No. 1-308577 is blended, which are golf balls for a criterion of comparison.

TABLE 3

|  | Example No. | | | | | | |
| --- | --- | --- | --- | --- | --- | --- | --- |
|  | 1 | 2 | 3 | 4 | 5 | 6 | 7 |
| Composition for cover (Preparation Example) | No. 1 | No. 2 | No. 3 | No. 4 | No. 5 | No. 6 | No. 7 |
| Ball weight (g) | 45.5 | 45.4 | 45.4 | 45.4 | 45.4 | 45.4 | 45.5 |
| Ball compression | 87 | 86 | 87 | 87 | 87 | 86 | 87 |
| Ball initial velocity (feet/second) | 252.9 | 252.8 | 252.9 | 252.9 | 252.8 | 252.8 | 252.8 |
| Flying distance (yard) | 229 | 228 | 229 | 229 | 228 | 228 | 228 |
| Hit feeling and control properties | ○ | ○ | ○ | ○ | ○ | ○ | ○ |

TABLE 4

|  | Comparative Example No. | | | | | | |
| --- | --- | --- | --- | --- | --- | --- | --- |
|  | 1 | 2 | 3 | 4 | 5 | 6 | 7 |
| Composition for cover (Comparative Preparation Example) | No. 1 | No. 2 | No. 3 | No. 4 | No. 5 | No. 6 | No. 7 |
| Ball weight (g) | 45.5 | 45.5 | 45.5 | 45.4 | 45.5 | 45.4 | 45.4 |
| Ball compression | 95 | 86 | 85 | 84 | 85 | 84 | 85 |
| Ball initial velocity (feet/second) | 253.0 | 250.8 | 251.4 | 251.0 | 251.3 | 251.0 | 251.0 |
| Flying distance (yard) | 229 | 222 | 224 | 223 | 224 | 223 | 223 |

TABLE 4-continued

|  | Comparative Example No. | | | | | | |
| --- | --- | --- | --- | --- | --- | --- | --- |
|  | 1 | 2 | 3 | 4 | 5 | 6 | 7 |
| Hit feeling and control properties | x | Δ | Δ | Δ | Δ | Δ | Δ |

As is apparent from the results shown in Tables 3 and 4, the golf balls of Examples 1 to 7 attained the ball initial velocity of 252.8 to 252.9 feet/second and the flying resistance of 228 to 229 yards. That is, they exhibited the ball initial velocity and flying distance which are almost the same as those of the golf ball of Comparative Example 1 wherein only high-rigid ionomer resin was used as the base resin of the cover, and were superior in resilience performances and flying performances. Further, the golf balls of Examples 1 to 7 were superior in hit feeling and control properties.

To the contrary, regarding the golf balls of Comparative Examples 2 to 7, the ball initial velocity was low and the flying distance was 5 to 7 yards inferior to that of Examples 1 to 7. That is, regarding the golf ball of Comparative Example 2 using a soft cover wherein a soft ionomer resin was blended and the golf balls of Comparative Examples 3 to 7 wherein BONDFIRST (trade name) as the glycidyl group-containing α-olefinic copolymer resin of the resin (C) was not formulated, the control properties were good. However, since the hit feeling was too soft and no improvement due to the resin (C) was not obtained, they were inferior in resilience performances and flying performances as described above.

Further, the evaluation of the golf balls of Examples 1 to 7 and Comparative Examples 1 to 7 according to the practical hitting test by the top professional golfers will be further explained in detail, as described hereinafter.

The golf balls of Examples 1 to 7 had excellent hit feeling and control properties similar to those of the thread wound golf ball coated with the cover containing transpolyisoprene (balata), and the flying distance attained to a satisfactory level.

On the other hand, the golf ball of Comparative Example 1 had hard hit feeling and, further, spin was not easily put on the golf ball and the control properties were inferior. The golf balls of Comparative Examples 2 to 7 had good control properties, but the hit feeling was too soft and slightly heavy and the flying distance was also inferior.

Furthermore, in order to examine the cut resistance of the golf balls of Examples 1 to 7 and Comparative Examples 1 to 7, the top part of the golf balls was hit at a head speed of 30 m/second using a swing robot mounted with a pitching wedge manufactured by True Temper Co. to examine whether a cut mark is arisen or not.

As a result, no cut mark is arisen in the golf balls of Examples 1 to 7 and Comparative Examples 1, but a small cut mark was arisen in the golf balls of Comparative Examples 2 to 7.

The cut resistance of a thread wound golf ball coated with a cover containing transpolyisoprene (balata) as a main component was also examined under the same condition. As a result, a large cut mark which can not stand use was arisen in the thread wound golf ball.

As described above, regarding the golf ball of Examples 1 to 7, the improvement of hit feeling and control properties has been accomplished by softening the cover without deterioration of flying distance and cut resistance. On the other hand, regarding the golf balls of Comparative Examples 2 to 7, cut resistance and flying distance were deteriorated by softening the cover and, further, the hit feeling was too soft and heavy.

Further, a golf ball coated with the cover containing only high-rigid ionomer resin as the base resin of Comparative Example 1 attained satisfactory flying distance, but the hit feeling was too hard and the control properties was also inferior.

Examples 8 to 14 and Comparative Examples 8 to 14

(Two-piece solid golf ball)

(1) Preparation of core

To 100 parts by weight of cis-1,4-polybutadiene (JSR BR01 (trade name), manufactured by Japan Synthetic Rubber Co., Ltd.), 30 parts by weight of zinc acrylate (manufactured by Nihon Shokubai Kogyo Co., Ltd.), 20 parts by weight of zinc oxide (manufactured by Toho Aen Co., Ltd.) and 1 part by weight of dicumyl peroxide (manufactured by Nihon Yushi Co., Ltd.) were added, and the mixture was kneaded and subjected to a pressure molding in a mold for core at 150° C. for 30 minutes to give a solid core having a diameter of 38.5 mm.

(2) Composition for cover

The pelletized compositions for the cover prepared in Preparation Examples 1 to 7 and Comparative Preparation Examples 1 to 7 were used.

(3) Production of golf ball

The composition for the cover obtained in the above item (2) was coated on the solid core obtained in the above item (1) by an injection molding to give a coated golf ball of 42.7 mm in diameter.

The ball weight, the ball compression, the ball initial velocity and the flying distance of the golf ball thus obtained were measured and, further, the hit feeling and the control properties were examined.

In Table 5, the physical properties, the hit feeling and the control properties of the golf balls of Examples 8 to 14, and the kind of the composition for the cover used in the production of the golf ball are shown. In Table 6, the physical properties, the hit feeling and the control properties of the golf balls of Comparative Examples 8 to 14, and the kind of the composition for the cover used in the production of the golf ball are shown. The kind of the composition for the cover is shown by Preparation Example No. or Comparative Preparation Example No.

The golf ball of Comparative Example 8 is a standard two-piece solid golf ball wherein only the high-rigid ionomer resin was used as the base resin of the cover, and is a golf ball for a criterion of comparison. Further, the measuring methods of various physical properties and the evaluation methods of the hit feeling and the control properties are the same as those used in the Examples 1 to 7.

TABLE 5

| | Example No. | | | | | | |
|---|---|---|---|---|---|---|---|
| | 8 | 9 | 10 | 11 | 12 | 13 | 14 |
| Composition for cover (Preparation Example) | No. 1 | No. 2 | No. 3 | No. 4 | No. 5 | No. 6 | No. 7 |
| Ball weight (g) | 45.4 | 45.3 | 45.3 | 45.4 | 45.3 | 45.3 | 45.3 |
| Ball compression | 94 | 93 | 94 | 94 | 94 | 93 | 94 |
| Ball initial velocity (feet/second) | 253.0 | 252.8 | 253.0 | 252.9 | 252.8 | 252.8 | 252.8 |
| Flying distance (yard) | 232 | 230 | 232 | 231 | 230 | 230 | 230 |

TABLE 5-continued

| | Example No. | | | | | | |
|---|---|---|---|---|---|---|---|
| | 8 | 9 | 10 | 11 | 12 | 13 | 14 |
| Hit feeling and control properties | ○ | ○ | ○ | ○ | ○ | ○ | ○ |

TABLE 6

| | Comparative Example No. | | | | | | |
|---|---|---|---|---|---|---|---|
| | 8 | 9 | 10 | 11 | 12 | 13 | 14 |
| Composition for cover (Comparative Preparation Example) | No. 1 | No. 2 | No. 3 | No. 4 | No. 5 | No. 6 | No. 7 |
| Ball weight (g) | 45.4 | 45.4 | 45.4 | 45.3 | 45.4 | 45.3 | 45.3 |
| Ball compression | 101 | 94 | 93 | 92 | 93 | 92 | 93 |
| Ball initial velocity (feet/second) | 252.9 | 250.7 | 251.3 | 251.0 | 251.3 | 251.0 | 251.0 |
| Flying distance (yard) | 231 | 224 | 226 | 225 | 226 | 225 | 225 |
| Hit feeling and control properties | x | Δ | Δ | Δ | Δ | Δ | Δ |

As is apparent from the results shown in Tables 5 and 6, the two-piece solid golf balls of the Examples 8 to 14 of the present invention were superior in hit feeling, control properties, resilience performances and flying performances, similar to the thread wound golf balls of the Examples 1 to 7.

What is claimed is:

1. A golf ball having a core and a cover for covering the core, a base resin of said cover comprising a heated mixture of the following resin (A), resin (B) and resin (c):

resin (A): an ionomer resin or a mixture thereof, said ionomer resin comprising a copolymer of 80 to 90% by weight of α-olefin and 10 to 20% by weight of α,β-unsaturated carboxylic acid having 3 to 8 carbon atoms, wherein said ionomer resin is partially neutralized with a metal ion;

resin (B): a terpolymer resin of α-olefin, unsaturated carboxylate and unsaturated carboxylic acid; and resin (C): a glycidyl group-containing α-olefinic copolymer resin, wherein the amount of the resin (A), resin (B) and resin (C) in the heated mixture respectively is 30 to 85% by weight, 10 to 69.8% by weight and 0.2 to 5% by weight.

2. The golf ball according to claim 1, wherein the resin (B) is a terpolymer resin of ethylene, (meth)acrylate and (meth)acrylic acid.

3. The golf ball according to claim 1, wherein the resin (B) is a terpolymer resin of ethylene, (meth) acrylate and an unsaturated dibasic acid selected from the group consisting of maleic acid, fumaric acid, itaconic acid, and half esters thereof.

4. The golf ball according to claim 1 wherein the resin (C) is an ethylene-glycidyl methacrylate copolymer resin, an ethylene-acrylate-glycidyl methacrylate terpolymer resin or an ethylene-vinyl acetate-glycidyl methacrylate terpolymer resin.

5. The golf ball according to claim 1, wherein the α-olefin of the ionomer resin (A) is selected from the group consisting of ethylene, propylene, 1-butene, and 1-pentene; and wherein the α,β-unsaturated carboxylic acid of the ionomer resin (A) is selected from the group consisting of acrylic acid, methacrylic acid, fumaric acid, maleic acid and crotonic acid.

6. The golf ball according to claim 1, wherein the resin (B) comprises 50 to 79% by weight of said α-olefin, 10 to 40% by weight by said unsaturated carboxylate, and 1 to 10% by weight of said unsaturated carboxylic acid.

7. A golf ball having a core and a cover for covering the core, a base resin of said cover comprising a heated mixture of the following resin (A), resin (B) and resin (C):

resin (A): and ionomer resin comprising a copolymer of 80 to 90% by weight of α-olefin and 10 to 20% by weight of α,β-unsaturated carboxylic acid having 3 to 8 carbon atoms, wherein a portion of carboxyl groups in said copolymer are neutralized with a metal ion, or a mixture of ionomer resins;

resin (B): a terpolymer resin of α-olefin, an ester of acrylic acid, and an unsaturated carboxylic acid selected from the groups consisting of acrylic acid, methacrylic acid, fumaric acid, maleic acid, itaconic acid, a half ester of fumaric acid, a half ester of maleic acid and a half ester of itaconic acid, wherein said terpolymer is not neutralized with a metal ion; and resin (C): a glycidyl group-containing α-olefinic copolymer resin selected from the group consisting of an ethylene-glycidyl methacrylate copolymer resin, an ethylene-acrylate-glycidly methacrylate terpolymer resin, and an ethylene-vinyl acetate-glycidyl methacrylate terpolymer resin, wherein resin (A) is present in an amount of 30 to 85% by weight, resin (B) is present in the amount of 10 to 69.8% by weight, and resin (C) is present in the amount of 0.2 to 5% by weight.

8. The golf ball according to claim 7, wherein the resin (B) is a terpolymer resin of ethylene, (meth) acrylate and (meth) acrylic acid.

\* \* \* \* \*